US012742645B2

(12) United States Patent
Cabello Maldonado

(10) Patent No.: US 12,742,645 B2
(45) Date of Patent: Sep. 22, 2026

(54) VEHICLE POSITION ESTIMATION SYSTEM

(71) Applicant: GE Aviation Systems LLC, Grand Rapids, MI (US)

(72) Inventor: Juan José Alejandro Cabello Maldonado, Querétaro (MX)

(73) Assignee: GE Aviation Systems LLC, Grand Rapids, MI (US)

(*) Notice: Subject to any disclaimer, the term of this patent is extended or adjusted under 35 U.S.C. 154(b) by 12 days.

(21) Appl. No.: 18/962,617

(22) Filed: Nov. 27, 2024

(65) Prior Publication Data

US 2026/0146853 A1 May 28, 2026

(51) Int. Cl.
*G01C 21/16* (2006.01)

(52) U.S. Cl.
CPC .................................. *G01C 21/165* (2013.01)

(58) Field of Classification Search
CPC .................................................. G01C 21/165
See application file for complete search history.

(56) References Cited

U.S. PATENT DOCUMENTS

| | | | | |
|---|---|---|---|---|
| 5,339,684 | A | 8/1994 | Jircitano et al. | |
| 6,014,103 | A * | 1/2000 | Sumner | G01C 21/188 342/457 |
| 8,781,737 | B2 | 7/2014 | Czompo | |
| 9,796,400 | B2 | 10/2017 | Puttagunta et al. | |
| 11,585,949 | B2 | 2/2023 | Makineni et al. | |
| 12,000,702 | B2 | 6/2024 | Ceisel et al. | |
| 2005/0004750 | A1* | 1/2005 | Huddle | G01C 19/58 701/510 |
| 2017/0074660 | A1* | 3/2017 | Gann | B64D 43/00 |

(Continued)

FOREIGN PATENT DOCUMENTS

| | | | |
|---|---|---|---|
| CN | 117474951 | A | 1/2024 |
| CN | 117710591 | A | 3/2024 |

(Continued)

OTHER PUBLICATIONS

Degregoria, Anthony, "Gravity Gradiometry and Map Matching: An Aid to Aircraft Inertial Navigation Systems", Air Force Institute of Technology, Feb. 1, 2010, downloaded from: https://apps.dtic.mil/sti/citations/ADA517387 on Oct. 4, 2024, 130 pages.

*Primary Examiner* — Daniel M. Robert
(74) *Attorney, Agent, or Firm* — McGarry Bair PC

(57) ABSTRACT

A system and a method for estimating a position of a vehicle. The vehicle includes a gradiometer. The method includes calculating a gravity vector using a gravity spatial derivative generated by the gradiometer and a plurality of body velocities generated by a body velocity source, calculating a gravity potential based on the gravity vector, and estimating an inertial measurement unit (IMU)-based position using the gravity vector, a body acceleration, and a body attitude. The method includes estimating a gravity vector-based position using the gravity vector and estimating a gravity map-based position using the gravity potential and one or more gravitational maps. The method includes estimating the position of the vehicle based on the IMU-based position, the gravity vector-based position, and the gravity map-based position, and controlling at least one of the vehicle and a second vehicle based on the position of the vehicle.

20 Claims, 6 Drawing Sheets

(56) References Cited

U.S. PATENT DOCUMENTS

| | | | |
|---|---|---|---|
| 2018/0128616 | A1 | 5/2018 | Malvern |
| 2022/0028262 | A1 | 1/2022 | Devassy et al. |
| 2023/0196618 | A1 | 6/2023 | Ivanov et al. |
| 2023/0221119 | A1 | 7/2023 | Kozuma |

FOREIGN PATENT DOCUMENTS

| | | | | |
|---|---|---|---|---|
| WO | 2008056972 | A1 | 5/2008 | |
| WO | WO-2018219975 | A1 * | 12/2018 | ............. H04B 11/00 |

* cited by examiner

VEHICLE POSITION ESTIMATION SYSTEM

FIELD

The subject matter described herein relates in general to estimating a position of a vehicle using a gradiometer and body inertial measurements.

BACKGROUND

Estimating an accurate position for a vehicle currently requires electromagnetic signals to correct and contain position estimation error. However, the electromagnetic signals may not be available and may be subject to unintended or intended interference. This means that accurate position estimation may be unavailable or inaccurate due to a dependence on unavailable and/or unreliable electromagnetic signals.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
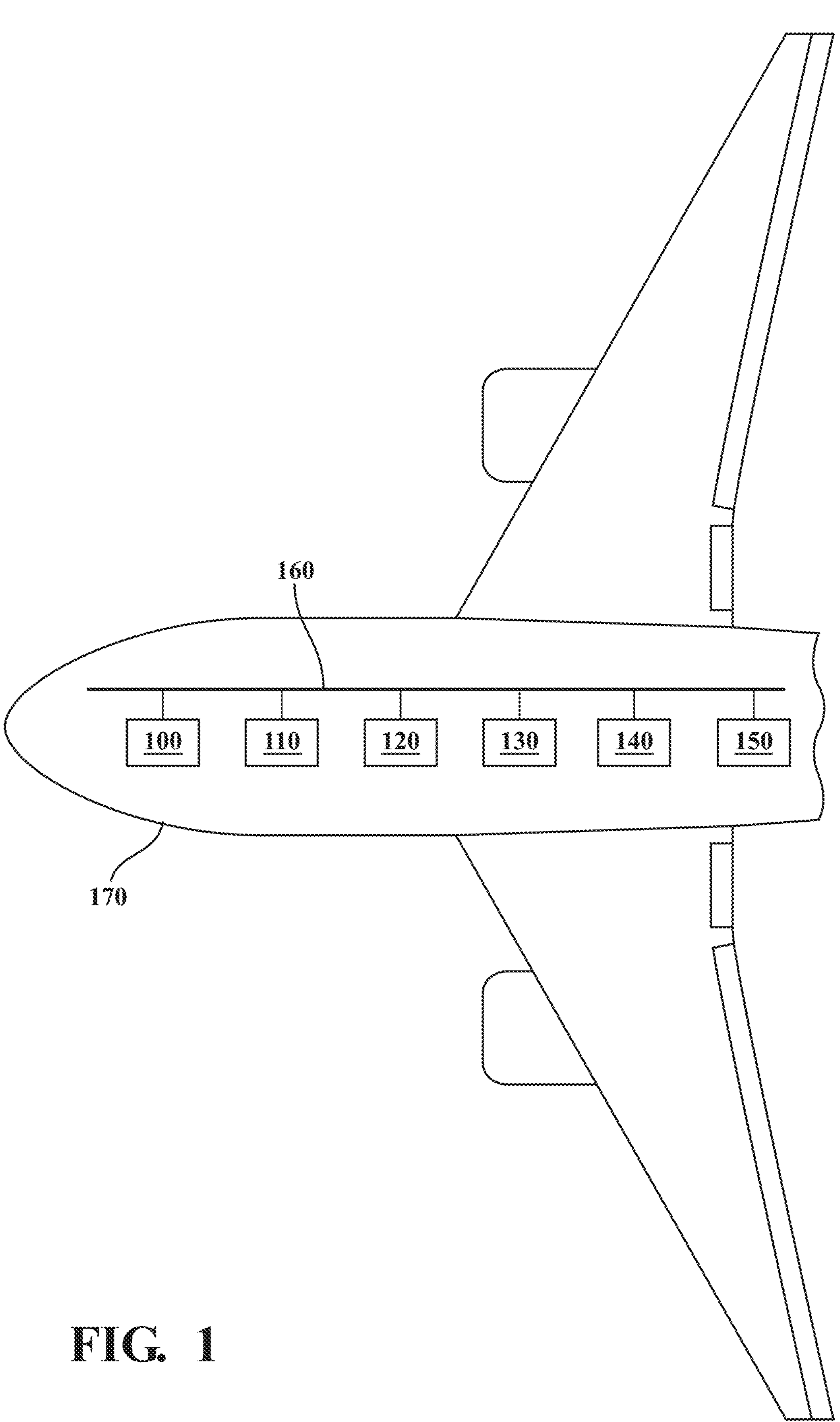
FIG. 1 illustrates one embodiment of a vehicle within which systems and methods disclosed herein may be implemented.

Systems, methods, and other embodiments associated with estimating a position of a vehicle using a gradiometer are disclosed. Accurately estimating the position of a vehicle such as an aircraft is useful for aircraft travel and navigation. More generally, any vehicle travelling by land, air, and/or sea would benefit from accurate and reliable position estimation.

Some approaches include utilizing external electromagnetic signal to obtain accurate vehicle position estimation. In such approaches, the external electromagnetic signals are used to correct and contain any vehicle position estimation error. However, the electromagnetic signals may be unavailable and may be subject to unintended or intended interference. In such cases, these approaches would be unable to accurately and reliably estimate the position of the vehicle using electromagnetic waves, e.g., light, image processing, laser, radio signals, etc.

Some approaches utilize the magnitude of a gravity vector associated with the vehicle but do not use the direction of the gravity vector. Further, some approaches utilize the gravity field to estimate the position of the vehicle using a current surveyed map.

These aforementioned approaches are susceptible to spoofing and include a dependency on multiple external devices such as satellite systems and ground stations. For example, these approaches may utilize satellite signals (e.g., Global Navigation Satellite Systems "GNSS") and ground station signals (such as navigation radios or cell towers) to provide vehicle position estimations.

While some approaches may utilize navigation aids, navigation aids do not ensure that continuous vehicle position estimation as navigation aid signals are subject to availability issues, intentional or unintentional interference, range loss, spamming, and/or denial of service attempts.

Accordingly, systems, methods, and other embodiments associated with vehicle position estimation are disclosed. In one embodiment, the disclosed approach includes a gradiometer or more specifically, a gravity gradiometer. The gradiometer is located inside the vehicle. The vehicle may be an aircraft, a watercraft, or an automobile.

The disclosed approach includes the gradiometer, a body velocity source, an inertial measurement unit (IMU), and/or a gravitational map source. The disclosed approach includes a method for accurately and reliably estimating the position of a vehicle without depending on external sources. In general, the method includes estimating the position of the vehicle using inertial accelerations and the Earth's gravitational field measurements by three distinct sub-methods. The first sub-method includes estimating the IMU-based position of the vehicle. The second sub-method includes estimating the gravity vector-based position of the vehicle. The third sub-method includes estimating the gravity map-based position of the vehicle.

The method includes receiving measurement data from the gradiometer, the body velocity source, the IMU, and the gravitational map source(s). The method includes receiving a gravity spatial derivative from the gradiometer and a plurality of body velocities from the body velocity source, processing the gravity spatial derivative and the plurality of body velocities through a function such as an integral over path function to generate a gravity vector. The method also includes processing the gravity vector through a second function such as a second integral over path function to generate a gravity potential. The method includes receiving body acceleration and body attitude of the vehicle from the IMU. The method also includes receiving gravitational maps from the gravitational map source which may be a server or a database.

The first sub-method, which is based on an IMU-Gradiometer sensor fusion, may include estimating a gravity vector using gravity gradiometer measurements, the plurality of body velocities, and analytic modelling, then utilizing the estimated gravity vector and inertial measurements from the IMU for dead reckoning. The first sub-method may include passing the gravity spatial derivative, the gravity vector, the body acceleration of the vehicle, and the body attitude of the vehicle through a filter such as a Kalman filter, resulting in the IMU-based position of the vehicle.

The second sub-method utilizes the magnitude and direction of the gravity vector to determine position. The second sub-method includes estimating an angle between the normal to the tangent plane to the World Geodetic System (WGS-84) ellipsoid at the point of measurement and the measured gravity vector in the sensor frame. The second sub-method includes geometrically calculating a latitude and a longitude for the gravity vector-based position of the vehicle based on the estimated angle. In other words, the second sub-method includes applying a deviation of the vertical compensation to the gravity vector, resulting in the gravity vector-based position of the vehicle.

The third sub-method utilizes machine learning, neural networks, and gravity map(s) to determine the gravity map-based position. The method includes utilizing the spatial gradient, the gravity vector, and the gravity potential at the point of measurement as inputs to a trained neural network to estimate the position of the vehicle. The neural network may be trained using measurements of Earth's Gravity Field and its anomalies, such as NASA GRACE-FO. NASA GRACE-FO Level 2 Monthly Geopotential Spherical Harmonics data set.

In summary, the third sub-method may include applying a map-matching algorithm to the gravity potential, vector and spatial derivatives and a neural network trained with measurements of the Earth's gravity field and its anomalies to determine the position of the vehicle within the gravitational map.

The method then includes creating an analog IMU-GNSS (Global Navigation Satellite System) system where one of the resulting vehicle position estimates from the three sub-methods is treated as a GNSS position. The method includes selecting the vehicle position estimate that has the lowest uncertainty (which may be analogous with the horizontal integrity limit "HIL").

More generally, the method may include combining the resulting vehicle position estimates from the three sub-methods into a single vehicle position estimate using a statistical method to merge the different position estimates into a single solution. The method may then include outputting the single vehicle position estimate to a user application and/or an output device or system.

This approach is novel for several reasons including the following: first, this approach estimates the position of a vehicle using maps as well as the direction and spatial rate of change of real measurements relating to the vehicle. Thus, the novelty of this approach is calculating the position directly from the gravity direction by using vector geometry. Second, this approach includes using the gradiometer measurements directly and matching them with a gravity map using a neural network to estimate a vehicle position. As such, the approach uses weights of a previously trained neural network and not a gravity/gradient map directly. Third, this approach, with the IMU-based position, the gravity vector-based position and the uncertainty associated with both positions computed, includes developing a tightly coupled approach where the position of the map matching algorithm (and a residual) is used as analogous to a GNSS position and HIL and using the gravity vector direction to compensate the gravity measured by the IMU.

The embodiments disclosed herein present various advantages over conventional technologies that estimate vehicle position. First, the embodiments are not dependent on external sources (e.g., satellite or ground stations) or measurements, as such, these embodiments are readily available and include non-spoofable solutions which may be deployed in various systems, e.g., terrain, mobile, or air systems. Second, the embodiments utilize less processing power and fewer processors. Third, the embodiments provide a more accurate vehicle position estimate, such that certification procedures are easily met. Fourth, the embodiments may utilize over-the-counter products such as a MEMS (microelectromechanical system) product, which may be used for developing the gradiometer. Fifth, the embodiments rely on the gravitational field which cannot be intentionally disturbed. As an example, the gradiometer may be developed using MEMS and IMUs arranged in a rotating configuration. The Earth gravitational field is a vector field that depends on the mass of the Earth and is not easily externally influenced. As such, the Earth gravitational field remains constant and non-disturbed. Sixth, the embodiments may be used to determine the accuracy of other position detecting sensors such as lidar, radar, laser, and/or global positioning system (GPS). Seventh, the embodiments may be used for controlling or operating a vehicle such as an aircraft by navigating the vehicle based on the position of the vehicle and/or route planning for the vehicle based on the position of the vehicle. Eighth, the embodiments may be used for controlling or operating a second vehicle. The second vehicle may be proximate to the vehicle. The position of the second vehicle may be determined based on the estimated position of the vehicle, the proximity between the vehicle and the second vehicle, and/or the relative distance between the vehicle and the second vehicle. Upon determining the position of the second vehicle, the second vehicle may be capable of determining navigation and/or route planning of the second vehicle based on the positions of the vehicle and the second vehicle.

In one embodiment, a system for estimating a position of a vehicle using a gradiometer is disclosed. The system includes a processor and a memory in communication with the processor. The memory stores machine-readable instructions that, when executed by the processor, cause the processor to calculate a gravity vector using a gravity spatial derivative generated by the gradiometer and a plurality of body velocities generated by the body velocity source, calculate a gravity potential based on the gravity vector, and estimate an inertial measurement unit (IMU)-based position of the vehicle using the gravity vector, a body acceleration of the vehicle, and a body attitude of the vehicle. An IMU generates the body acceleration and the body attitude. The memory further stores machine-readable instructions that, when executed by the processor, cause the processor to estimate a gravity vector-based position of the vehicle using the gravity vector, and estimate a gravity map-based position of the vehicle using the gravity potential and one or more gravitational maps. The memory further stores machine-readable instructions that, when executed by the processor, cause the processor to estimate the position of the vehicle based on the IMU-based position, the gravity vector-based position, and the gravity map-based position, and control at least one of the vehicle and a second vehicle based on the position of the vehicle.

In another embodiment, a method for estimating a position of a vehicle using a gradiometer is disclosed. The method includes calculating, by a processor, a gravity vector using a gravity spatial derivative generated by the gradiometer and a plurality of body velocities generated by a body velocity source, and calculating, by the processor, a gravity potential based on the gravity vector. The method further includes estimating, by the processor, an inertial measurement unit (IMU)-based position of the vehicle using the gravity vector, a body acceleration of the vehicle, and a body attitude of the vehicle. The IMU generates the body acceleration and the body attitude. The method includes estimating, by the processor, a gravity vector-based position of the vehicle using the gravity vector and estimating, by the processor, a gravity map-based position of the vehicle using the gravity potential and one or more gravitational maps. The method further includes estimating, by the processor, the position of the vehicle based on the IMU-based position, the gravity vector-based position, and the gravity map-based position and controlling at least one of the vehicle and a second vehicle based on the position of the vehicle.

In another embodiment, a non-transitory computer-readable medium for estimating a position of a vehicle using a gradiometer is disclosed. The non-transitory computer-readable medium includes instructions that when executed by one or more processors to calculate a gravity vector using a gravity spatial derivative generated by the gradiometer and a plurality of body velocities generated by a body velocity source, calculate a gravity potential based on the gravity vector, and estimate an inertial measurement unit (IMU)-based position of the vehicle using the gravity vector, a body acceleration of the vehicle, and a body attitude of the vehicle. An IMU generates the body acceleration and the body attitude. The instructions further include instructions that when executed by the one or more processors cause the one or more processors to estimate a gravity vector-based position of the vehicle using the gravity vector and estimate a gravity map-based position of the vehicle using the gravity potential and one or more gravitational maps. The instructions further include instructions that when executed by the one or more processors cause the one or more processors to estimate the position of the vehicle based on the IMU-based position, the gravity vector-based position, and the gravity map-based position and control at least one of the vehicle and a second vehicle based on the position of the vehicle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIG. 1 illustrates one embodiment of a vehicle within which systems and methods disclosed herein may be implemented. Referring to FIG. 1 and as an example, a block diagram of an aircraft 170 incorporating a vehicle position estimation system 100 is illustrated. Although, an aircraft is being shown as an example of the vehicle, the vehicle may be any vehicle that travels by land, air, and/or sea. As such, the vehicle may be an aircraft 170, a watercraft, or an automobile. In this example, the aircraft 170 includes various elements. It will be understood that in various embodiments, it may not be necessary for the aircraft 170 to have all of the elements shown in FIG. 1. The aircraft 170 can have any combination of the various elements shown in FIG. 1. Further, the aircraft 170 can have additional elements to those shown in FIG. 1. In some arrangements, the aircraft 170 may be implemented without one or more of the elements shown in FIG. 1. While the various elements are shown as being located within the aircraft 170 in FIG. 1, it will be understood that one or more of these elements can be located external to the aircraft 170. Further, the elements shown may be physically separated by large distances.

The aircraft 170 may include various elements such as the vehicle position estimation system 100, one or more gravity gradiometers 110, one or more body velocity sources 120, one or more inertial measurement units (IMU) 130, one or more gravitational map sources 140, one or more output systems 150, and/or one or more communication networks 160. The various elements of the vehicle position estimation system 100 may be communicatively linked through one or more communication networks 160. As used herein, the term "communicatively linked" can include direct or indirect connections through a communication channel or pathway or another component or system. A "communication network" means one or more components designed to transmit and/or receive information from one source to another. The communication network(s) 160 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network(s) 160 further can be implemented as or include one or more wireless networks, whether short or long range. For example, in terms of short-range wireless networks, the communication network(s) can include a local wireless network built using a Bluetooth or one of the IEEE 802 wireless communication protocols, e.g., 802.11a/b/g/i, 802.15, 802.16, 802.20, Wi-Fi Protected Access (WPA), or Wi-Fi Protected Access (WPA2). In terms of long-range wireless networks, the communication network(s) 160 can include a mobile, cellular, and or satellite-based wireless network and support voice, video, text, and/or any combination thereof. Examples of long-range wireless networks can include GSM, TDMA, CDMA, WCDMA networks or the like. The communication network(s) 160 can include wired communication links and/or wireless communication links. The communication network(s) 160 can include any combination of the above networks and/or other types of networks. The communication network(s) 160 can include one or more routers, switches, access points, wireless access points, and/or the like. One or more elements of the vehicle position estimation system 100 include and/or can execute suitable communication software, which enables two or more of the elements to communicate with each other through the communication network(s) 160 and perform the functions disclosed herein.

The gravity gradiometer 110 (generally known as a gradiometer) is an instrument for measuring a spatial rate of change of components of a gravity field. The spatial rate of change of gravity is also known as a gravity spatial derivative. The gravity gradiometer 110 may measure the gravitational acceleration difference between two locations using two independent sensors, each at a different location. As an example, the two independent sensors may be accelerometers. The gravity gradiometer 110 may output the gravity spatial derivative based on the location and motion of a vehicle. In this example, the gravity gradiometer 110 may output a gravity spatial derivative in relation to the location and motion of the aircraft 170.

The body velocity source 120 is a device that is capable of providing the velocity and the direction of travel of a vehicle. As an example, the body velocity source may be an IMU, a Doppler velocity sensor, a radar, or a combination of sensors such as a speedometer and a compass.

The IMU 130 is an electronic device for measuring and reporting an object's motion, including acceleration, rotation, attitude, and velocity. More generally, the IMU 130 measures and reports acceleration, orientation (also known as attitude), angular rates, and other gravitational forces. The IMU 130 may be composed of three accelerometers, three gyroscopes, and, depending on a heading requirement, three magnetometers. The IMU 130 may output the acceleration of the vehicle and the attitude of the vehicle. In this example, the IMU 130 may output the acceleration and attitude of the aircraft 170.

The gravitational map source 140 may be any suitable data storage unit and/or server capable of storing gravitational maps. A gravitational map (also known as a gravitational field map) is a map that depicts gravity measurements across an area of space. The gravity measurements may be obtained using gravimetry. The gravitational map source 140 may be a database located in the aircraft 170 or external to the aircraft 170. The gravitational map source 140 may be a third-party such as a government body.

The output system 150 includes any device, component, or arrangement or groups thereof that enable information/data to be presented to a user. As an example, the output system 150 may be an audio system such as a speaker and/or a visual system such as a display screen.

The vehicle position estimation system 100 is a system that estimates the position of a vehicle based on information from the gravity gradiometer 110, the body velocity source 120, the IMU 130, and the gravitational map source 140. The vehicle position estimation system 100 may then output the estimated position of the vehicle to the output system 150. The vehicle position estimation system 100 may also transmit the estimated position of the vehicle to a user application within the vehicle and/or a user application outside the vehicle. As an example, the vehicle position estimation system 100 may transmit the estimated position of the aircraft 170 to a navigation system within the aircraft 170. Additionally and/or alternatively, the vehicle position estimation system 100 may transmit the estimated position of the aircraft 170 to a user application external to the aircraft 170 such as a tracking application at air traffic control and/or an air traffic control tower. The vehicle position estimation system 100 is described in further detail below.

Figure 2:
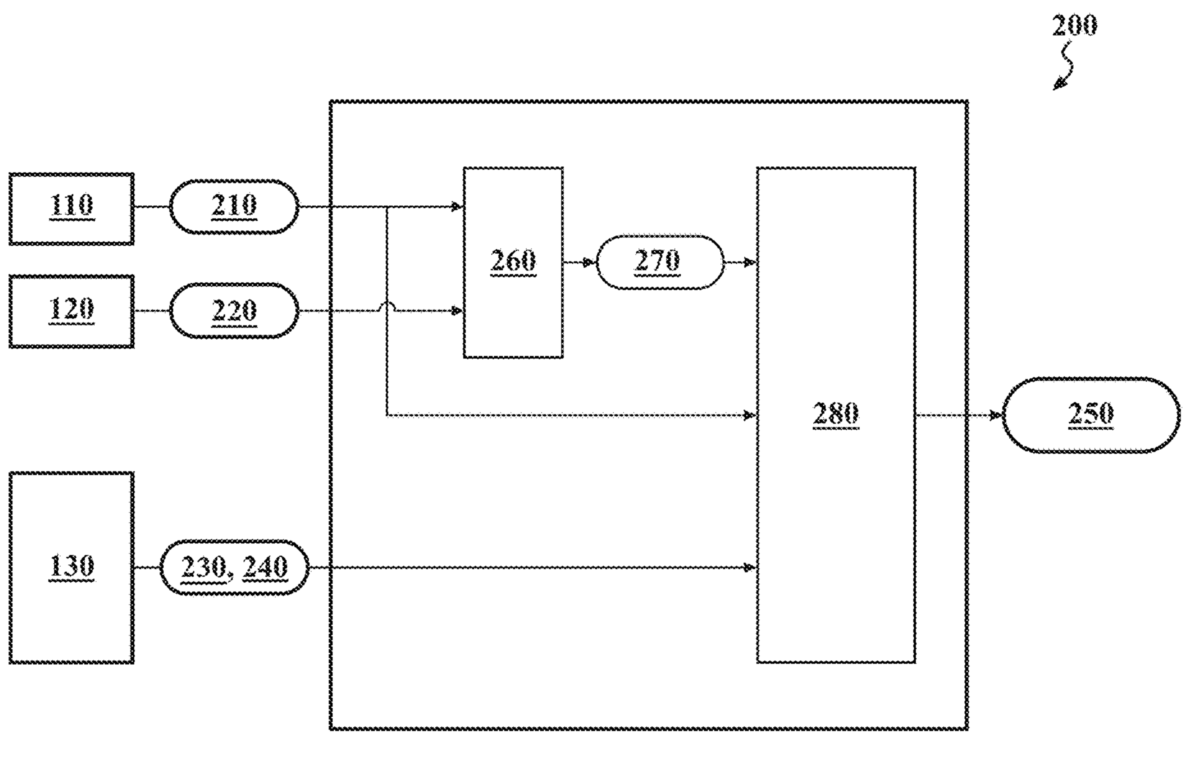
FIG. 2 illustrates one embodiment of a method of estimating an inertial measurement unit (IMU)-based position of a vehicle.

FIG. 2 illustrates one embodiment of a method 200 of estimating an inertial measurement unit (IMU)-based position 250 of a vehicle such as an aircraft 170. The method 200 includes receiving a gravity spatial derivative 210 from the gravity gradiometer 110, receiving a body velocity 220 of the vehicle from the body velocity source 120, and receiving a body acceleration 230 and a body attitude 240 from the IMU 130. The method 200 then includes applying a function 260 to the gravity spatial derivative 210 and the body velocity 220. More specifically, the method 200 includes applying a function 260 such as an integral over path function and/or an analytic modelling process on the gravity spatial derivative 210 and the body velocity 220, resulting in a gravity vector 270. The gravity vector 270 is the perpendicular line of equipotential surface of gravity. The method 200 then includes processing the gravity vector 270, the body acceleration 230 and the body attitude 240 using a filter 280 such as an IMU Kalman filter, resulting in the IMU-based position 250 of the vehicle.

In summary, the method 200 utilizes the gravity vector 270 direction to compensate the body acceleration 230 so as to achieve a more accurate dead reckoning. As such, the method 200 includes calculating the IMU-based position 250 of the vehicle based on the direction of the gravity vector 270 and using vector geometry. The IMU-based position 250 of the vehicle may be in any suitable format such as geographical coordinates.

Figure 3:
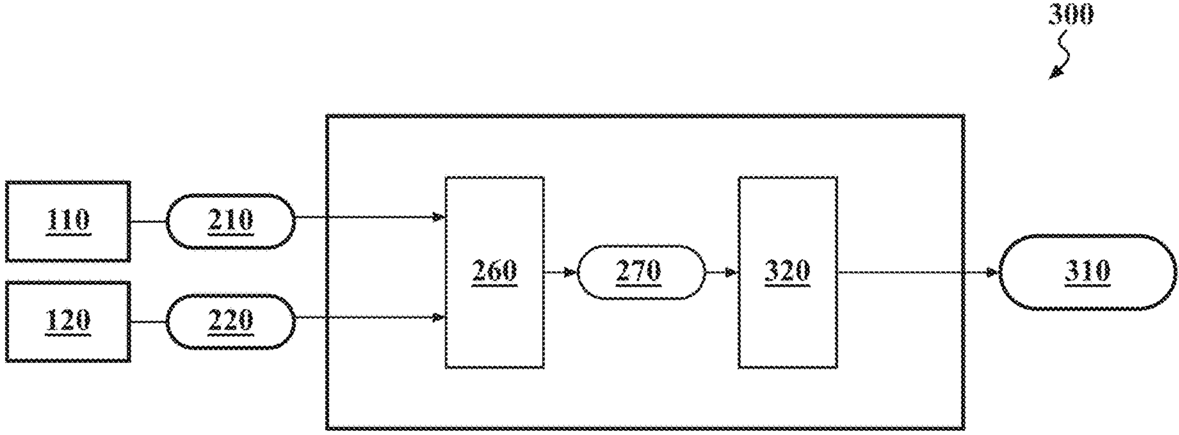
FIG. 3 illustrates one embodiment of a method of estimating a gravity vector-based position of a vehicle.

FIG. 3 illustrates one embodiment of a method 300 of estimating a gravity vector-based position 310 of a vehicle such as an aircraft 170. The method 300 includes, as disclosed above, receiving the gravity spatial derivative 210 from the gravity gradiometer 110, receiving the body velocity 220 from the body velocity source 120, and applying a function 260 to the gravity spatial derivative 210 and body velocity 220. Also, as disclosed above, the method 300 may apply a function 260 such as the integral over path function and/or an analytic modelling process on the gravity spatial derivative 210, resulting in the gravity vector 270. The method 300 then includes processing the gravity vector 270, by determining the deviation of the vertical compensation 320 of the gravity vector 270, resulting in the gravity vector-based position 310 of the vehicle. The gravity vector-based position 310 of the vehicle may be in any suitable format such as geographical coordinates.

In summary, the method includes using the magnitude and direction of the gravity vector 270 to determine the position of the vehicle. As an example, the method 300 may include estimating an angle between a normal to a tangent plane to a World Geodetic System (WGS-84) ellipsoid and the measured gravity vector 270 to geometrically calculate the latitude and longitude based on the estimated angle. Additionally and/or alternatively, the method 300 may include using available gravitational surveys to determine the initial conditions such as the velocity of the vehicle in a 3-dimensional format, e.g., $V_{x0}$, $V_{y0}$, $V_{z0}$. The method 300 may then include using the initial conditions, the measured second order gradient tensor from the gravity gradiometer 110, a path provided by the IMU 130, and formulae for obtaining the gravitational gradient (e.g., the gravitational acceleration) direction that has been corrected by the deviation of vertical compensation 320 to obtain the estimated position based on geometry.

Figure 4:
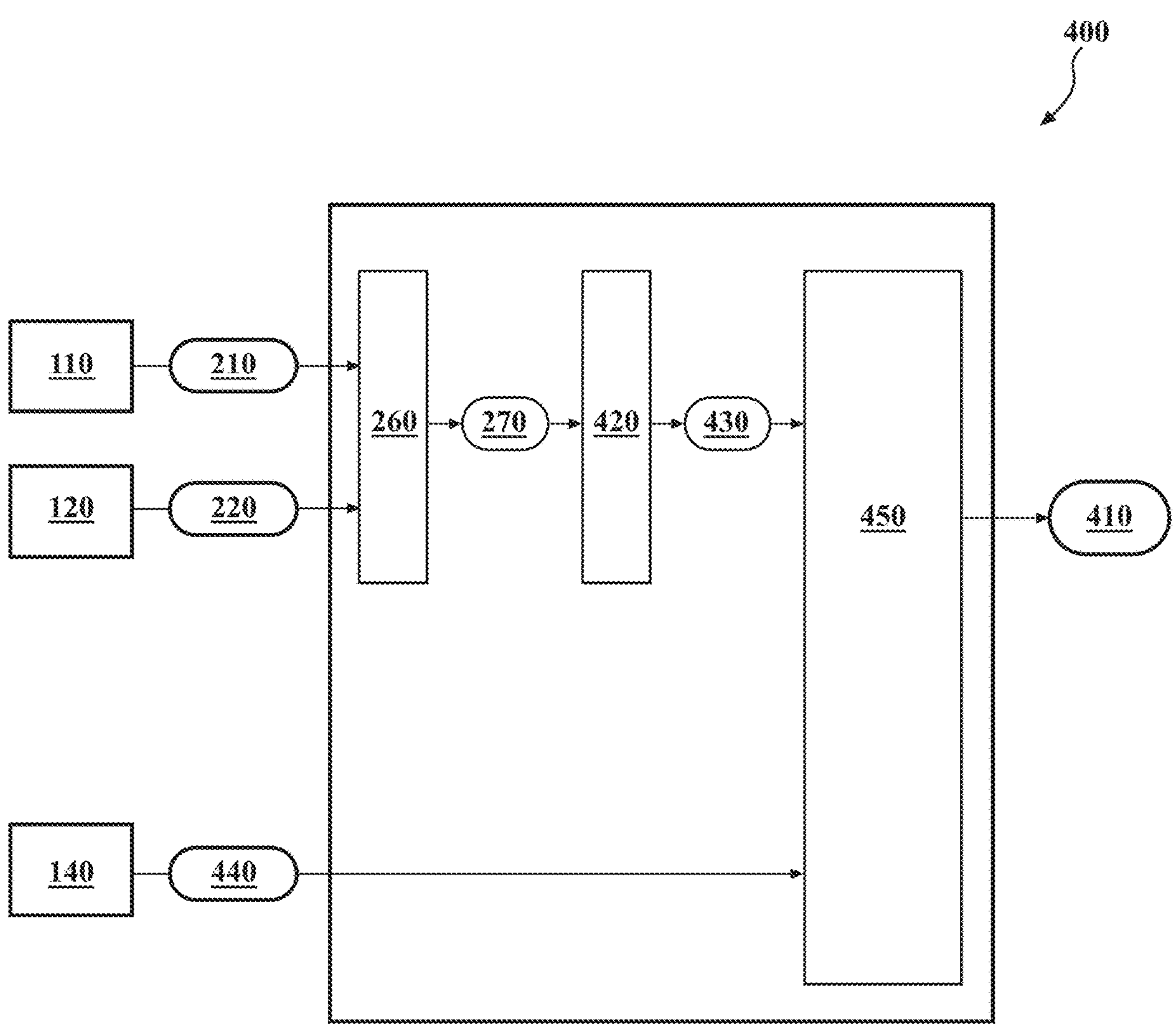
FIG. 4 illustrates one embodiment of a method of estimating a gravity map-based position of a vehicle.

FIG. 4 illustrates one embodiment of a method 400 of estimating a gravity map-based position 410 of a vehicle such the aircraft 170. The method 400 includes, as disclosed above, receiving the gravity spatial derivative 210 from the gravity gradiometer 110, receiving the body velocity 220 from the body velocity source 120, and applying a function 260 to the gravity spatial derivative 210 and the body velocity 220 to generate the gravity vector 270. Also, as disclosed above, the method 400 includes applying a function 260 such as the integral over path function and/or an analytic modelling process on the gravity spatial derivative 210, resulting in the gravity vector 270. The method 400 further includes applying a second function 420 such as a second integral over path function and/or a second analytic modelling process on the gravity vector 270, resulting in a gravity potential 430.

The method 400 includes receiving one or more gravitational maps 440 from the gravitational map source 140. The method 400 then includes applying a map matching algorithm 450 to the gravity potential 430 and the gravitational map(s) 440 to estimate a position in the gravitational map(s) 440 that has a matching gravity potential. The method 400 includes, upon identifying the position in the gravitational map 440 that matches the gravity potential 430, assigning the position to the gravity map-based position 410 of the vehicle. The gravity map-based position 410 of the vehicle may be in any suitable format such as geographical coordinates.

Figure 5:
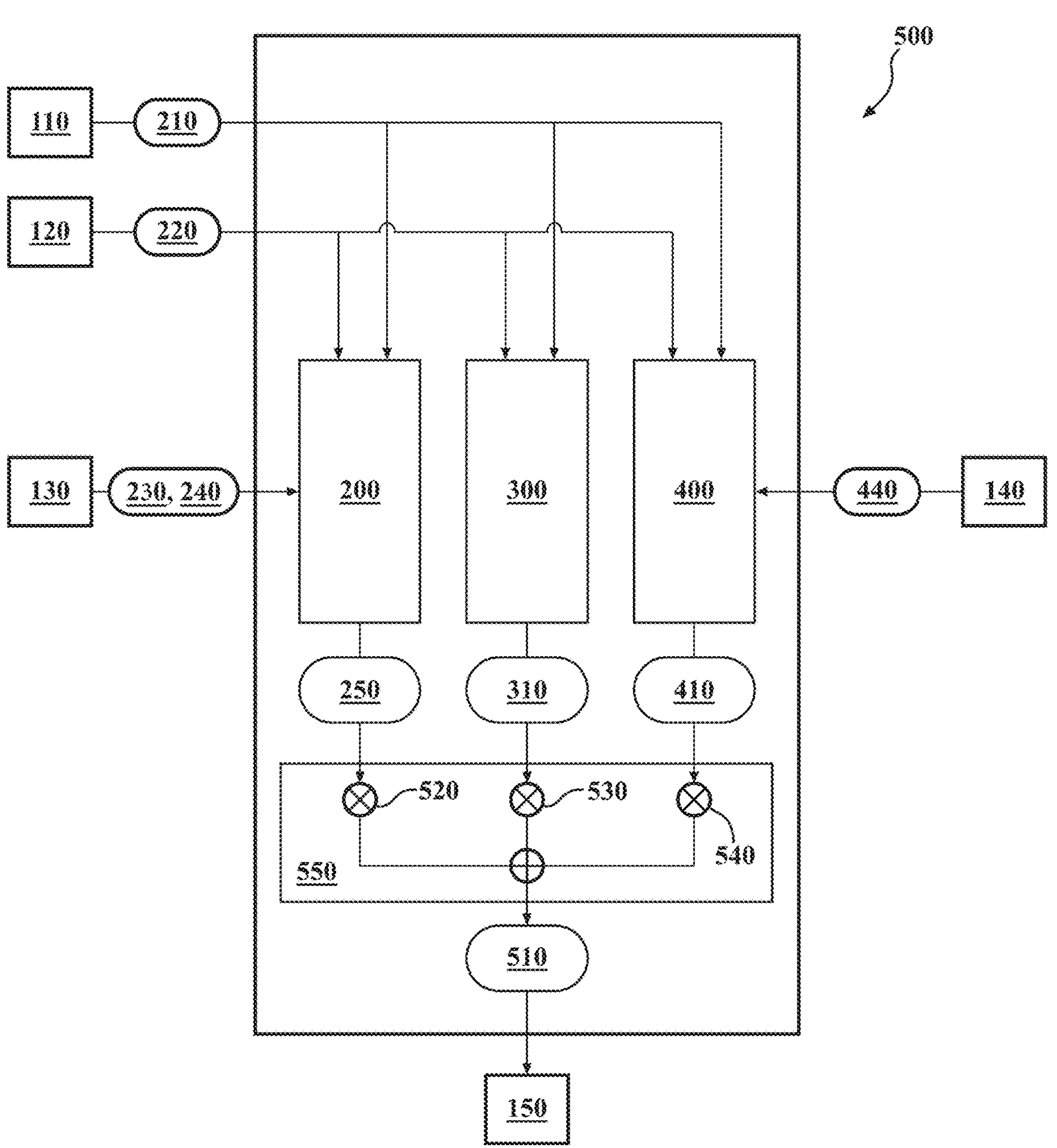
FIG. 5 illustrates one embodiment of a method of estimating a position of a vehicle based on the IMU-based position, the gravity vector-based position, and the gravity map-based position.

FIG. 5 illustrates one embodiment of a method 500 of estimating a position 510 of a vehicle such as an aircraft 170 based on the IMU-based position 250, the gravity vector-based position 310, and the gravity map-based position 410. The method 500 includes estimating the IMU-based position 250, the gravity vector-based position 310, and the gravity map-based position 410 as disclosed above. The method 500 then includes estimating the position 510 of the vehicle based on a function 550 of the IMU-based position 250, the gravity vector-based position 310, and the gravity map-based position 410. As an example, the function 550 may be an average of the IMU-based position 250, the gravity vector-based position 310, and the gravity map-based position 410. Further, the function 550 may include averaging the geographical coordinates of the IMU-based position 250, the gravity vector-based position 310, and the gravity map-based position 410. As another example, the function 550 may be a weighted average of the IMU-based position 250, the gravity vector-based position 310, and the gravity map-based position 410. In such an example, each of the IMU-based position 250, the gravity vector-based position 310, and the gravity map-based position 410 may be assigned a weighting factor 520, 530, 540. As an example, the weighting factor 520, 530, 540 may be based on the accuracy of the method 200, 300, 400 for estimating the position of the vehicle. In other words, a first weighting factor 520 is assigned to the method 200 for estimating the IMU-based position 250, a second weighting factor 530 is assigned to the method 300 for estimating the gravity vector-based position 310, and a third weighting factor 540 is assigned to the method 400 for estimating the gravity map-based position 410. The function 550 may then include averaging the geographical coordinates of the IMU-based position 250, the gravity vector-based position 310, and the gravity map-based position 410 in combination with the first, second, and third weighting factors 520, 530, 540, respectively. As such, the method 500 then includes applying the function 550 to the geographical coordinates of the IMU-based position 250, the gravity vector-based position 310, and the gravity map-based position 410 in combination with the first, second, and third weighting factors 520, 530, 540, resulting in the position 510 of the vehicle. The method 500 may include outputting the position 510 of the vehicle to an output system 150 and/or a user application, as previously mentioned.

Figure 6:
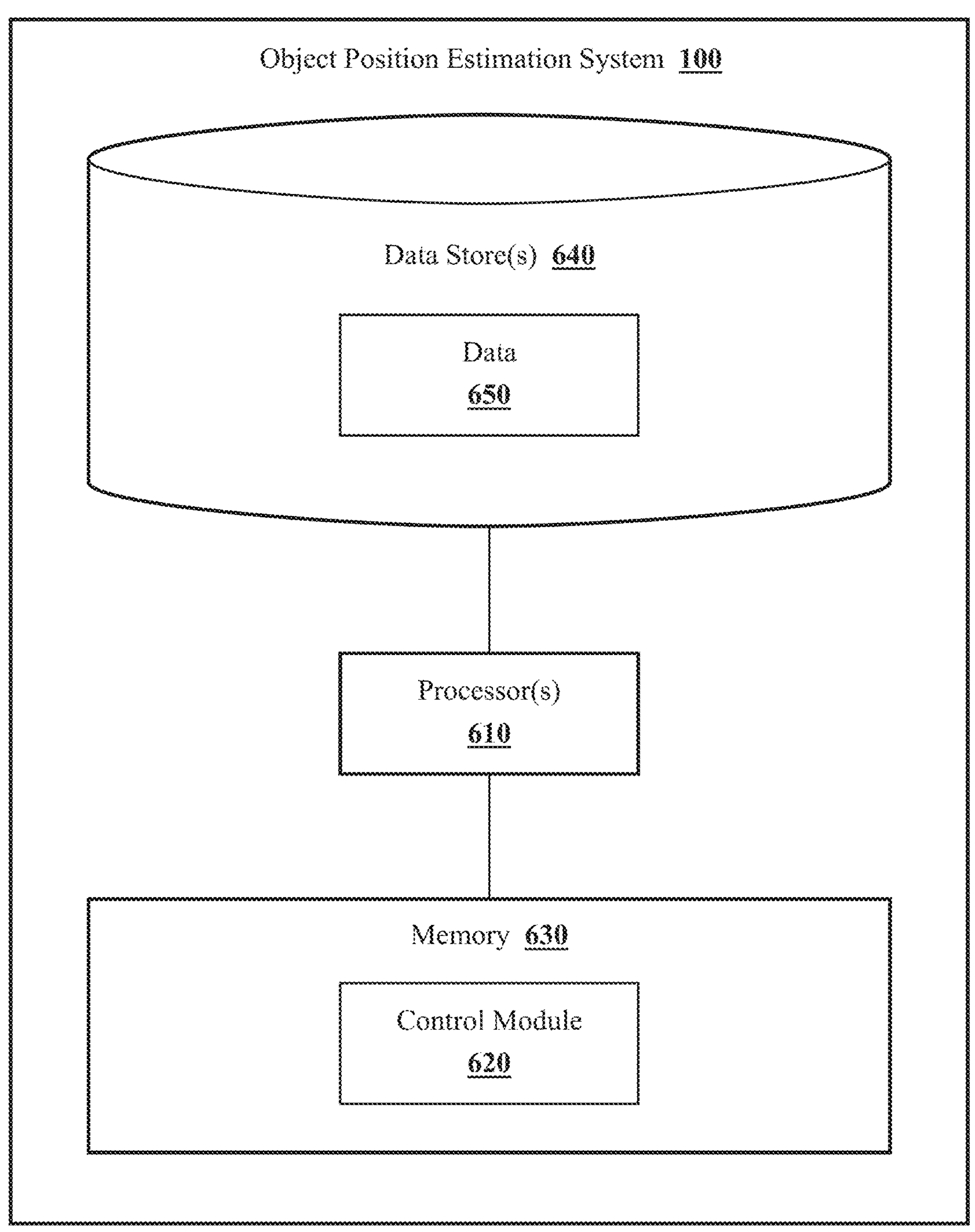
FIG. 6 is an embodiment of a vehicle position estimation system.

With reference to FIG. 6, one embodiment of the vehicle position estimation system 100 is further illustrated. The vehicle position estimation system 100 is shown as including a processor 610. Accordingly, the processor 610 may be a part of the vehicle position estimation system 100, or the vehicle position estimation system 100 may access the processor 610 through a data bus or another communication path. In one or more embodiments, the processor 610 is an application-specific integrated circuit (ASIC) that is configured to implement functions associated with a control module 620. In general, the processor 610 is an electronic processor, such as a microprocessor, that is capable of performing various functions as described herein.

In one embodiment, the vehicle position estimation system 100 includes a memory 630 that stores the control module 620 and/or other modules that may function in support of estimating the position 510 of a vehicle. The memory 630 is a random-access memory (RAM), read-only memory (ROM), a hard disk drive, a flash memory, or another suitable memory for storing the control module 620. The control module 620 is, for example, computer-readable instructions that, when executed by the processor 610, cause the processor 610 to perform the various functions disclosed herein. In further arrangements, the control module 620 is a logic, integrated circuit, or another device for performing the noted functions that includes the instructions integrated therein.

Furthermore, in one embodiment, the vehicle position estimation system 100 includes a data store 640. The data store 640 is, in one arrangement, an electronic data structure stored in the memory 630 or another data store, and that is configured with routines that can be executed by the processor 610 for analyzing stored data, providing stored data, organizing stored data, and so on. Thus, in one embodiment, the data store 640 stores data 650 used by the control module 620 in executing various functions. For example, as depicted in FIG. 6, the data store 640 includes data 650 such as gravity spatial derivatives 210, body velocity 220, gravity vectors 270, gravity potentials 430, body accelerations 230, body attitude 240, and gravitational maps 440, along with, for example, other information that is used and/or produced by the control module 620.

While the vehicle position estimation system 100 is illustrated as including the various data elements, it should be appreciated that one or more of the illustrated data elements may not be included within the data store 640 in various implementations and may be included in a data store that is external to the vehicle position estimation system 100. In any case, the vehicle position estimation system 100 stores various data elements in the data store 640 to support functions of the control module 620.

In one embodiment, the control module 620 includes instructions that, when executed by the processor(s) 610, cause the processor(s) 610 to calculate a gravity vector 270 based on a gravity spatial derivative 210 generated by the gravity gradiometer 110 and a plurality of body velocities generated by a body velocity source 120, and calculate a gravity potential 430 based on the gravity vector 270. As previously mentioned, the gravity gradiometer 110 is fixed to the vehicle such as an aircraft 170 and the gravity gradiometer 110 generates the gravity spatial derivative 210 based on a gravity field measurement in relation to the position of the gravity gradiometer 110. The body velocity source 120 is also fixed to the vehicle and the body velocity source 120 generates the body velocity of the vehicle based on the speed of travel and the direction of travel of the vehicle. The control module 620 may calculate the gravity vector 270 based on the gravity spatial derivative 210 and the body velocity 220 using any suitable function. As an example, the control module 620 may calculate the gravity vector 270 by applying an integral over path function to the gravity spatial derivative 210 and the plurality of body velocities. The control module 620 may calculate the gravity potential 430 based on the gravity vector 270 using any suitable function. As an example, the control module 620 may calculate the gravity potential 430 by applying an integral over path function to the gravity vector 270. In one arrangement, the control module 620 may apply the same integral over path function to the gravity spatial derivative 210 to generate the gravity vector 270 and to the gravity vector 270 to generate the gravity potential 430. In another arrangement, the control module 620 may apply different integral over path functions to the gravity spatial derivative

210 and body velocity 220 and to the gravity vector 270 to generate the gravity vector 270 and the gravity potential 430, respectively.

In one embodiment, the control module 620 includes instructions that, when executed by the processor(s) 610, cause the processor(s) 610 to estimate an inertial measurement unit (IMU)-based position 250 of the vehicle based on the gravity spatial derivative 210, the plurality of body velocities 220, the gravity vector 270, a body acceleration 230, and a body attitude 240. As mentioned above, the IMU 130 generates the body acceleration 230 and the body attitude 240 of the vehicle. The control module 620 may then receive the body acceleration 230 and the body attitude 240 of the vehicle from the IMU 130. The control module 620 may apply a filter 280 to the gravity spatial derivative 210, the body velocity 220, the gravity vector 270, the body acceleration 230 of the vehicle, and the body attitude 240 of the vehicle to determine the position of the vehicle. The control module 620 may apply any suitable filter. As an example, the control module 620 may apply a filter 280 such as a Kalman filter to the gravity spatial derivative 210, the body velocity 220, the gravity vector 270, the body acceleration 230 of the vehicle, and the body attitude 240 of the vehicle to determine the position of the vehicle. The position of the vehicle is the IMU-based position 250 of the vehicle.

In one embodiment, the control module 620 includes instructions that, when executed by the processor(s) 610, cause the processor(s) 610 to estimate a gravity vector-based position 310 of the vehicle based on the gravity vector 270. The control module 620 may determine a deviation of a vertical compensation 320 based on the gravity vector 270 using any suitable function. The control module 620 may then determine or estimate the position of the vehicle based on the deviation of the vertical compensation 320. The position of the vehicle is the gravity vector-based position 310 of the vehicle.

In one embodiment, the control module 620 includes instructions that, when executed by the processor(s) 610, cause the processor(s) 610 to estimate a gravity map-based position 410 of the vehicle based on the gravity potential 430 and one or more gravitational maps 440. The control module 620 may generate the gravity potential 430 as disclosed above. The control module 620 may generate the one or more gravitational maps 440 or may request and receive the one or more gravitational maps 440 from a database as disclosed above. The control module 620 may then determine the location of the gravity potential 430 on the gravitational map(s) 440. As an example, the control module 620 may utilize a map matching process or algorithm 450 to identify the location of the gravity potential 430 on the gravitational map(s) 440. The control module 620 may then assign the location of the gravity potential 430 on the gravitational map(s) 440 to the position of the vehicle. The position of the vehicle is the gravity map-based position 410 of the vehicle.

In one embodiment, the control module 620 includes instructions that, when executed by the processor(s) 610, cause the processor(s) 610 to estimate a position 510 of the vehicle based on the IMU-based position 250, the gravity vector-based position 310, and the gravity map-based position 410. As previously mentioned, the control module 620 may determine the position 510 of the vehicle based on a combination of the estimated IMU-based position 250, the estimated gravity vector-based position 310, and the estimated gravity map-based position 410. Also, as previously mentioned and as an example, the control module 620 may determine the position 510 of the vehicle based on a weighted average of the estimated IMU-based position 250, the estimated gravity vector-based position 310, and the estimated gravity map-based position 410 using the geographic coordinates for each of estimated IMU-based position 250, the estimated gravity vector-based position 310, and the estimated gravity map-based position 410.

In one embodiment, the control module 620 includes instructions that, when executed by the processor(s) 610, cause the processor(s) 610 to output the position 510 of the vehicle to an output system 150. The control module 620 may output the estimated position 510 of the vehicle to a user application or any suitable device. As an example, the control module 620 may output the estimated position 510 of the vehicle to an output system 150 such as a speaker and/or a display screen. As another example, the control module 620 may output the estimated position 510 to a third party such as a database or a server. In such an example, the control module 620 may transmit the estimated position 510 to the third party in a wireless or wired format. As previously mentioned, the control module 620 may transmit the estimated position 510 to an entity within the vehicle such as a navigation system within the aircraft 170 and/or an entity external to the vehicle such as a second vehicle or aircraft, a command center, and/or air control tower. Other vehicles, aircraft, command centers, and/or air control towers may determine the position of other vehicles or aircraft based on the estimated position 510 of the vehicle and the proximity of the other vehicles or aircraft to the vehicle.

In one embodiment, the control module 620 includes instructions that, when executed by the processor(s) 610, cause the processor(s) 610 to control at least one of the vehicle and a second vehicle based on the estimated position 510 of the vehicle. As an example, the control module 620 may control the vehicle based on the estimated position 510 of the vehicle. In such an example, the control module 620 may generate a route plan for the vehicle based on the estimated position 510 of the vehicle and a predetermined destination. The control module 620 may activate a route planning system within the vehicle to generate the route plan. As another example, the control module 620 may operate the vehicle and control the direction and speed of travel of the vehicle. In such an example, the control module 620 may activate a vehicle control system within the vehicle such as an autonomous or semi-autonomous system to control the vehicle based on the estimated position 510 of the vehicle, the route plan, and/or the predetermined destination of the vehicle. The control module 620 may determine the accuracy of other sensor(s) within the vehicle such as radar, lidar, or laser by comparing the estimated position 510 of the vehicle to a detected position from the other sensor(s).

Figure 7:
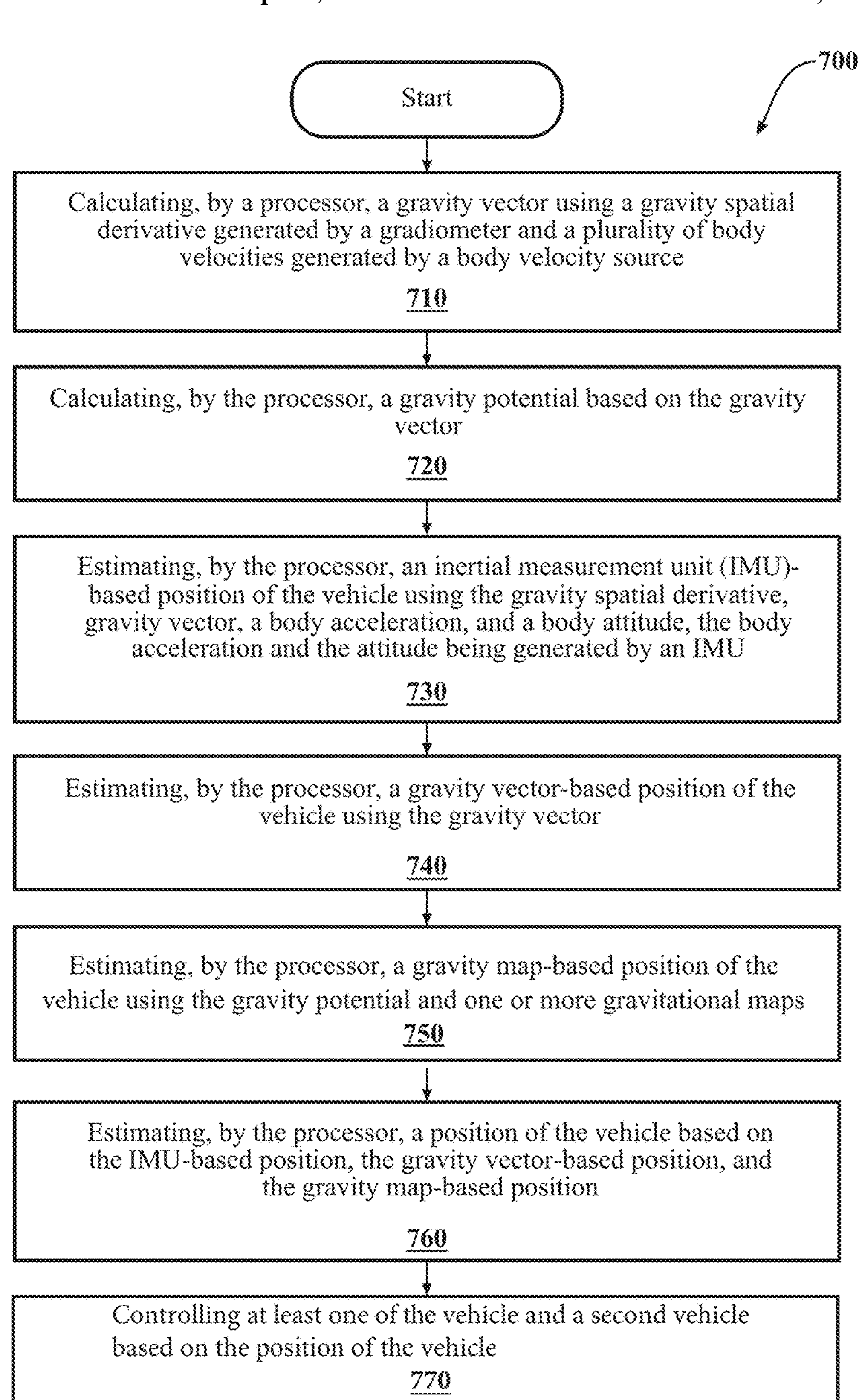
FIG. 7 is a flowchart for estimating the position of the vehicle.

Turning to FIG. 7, a flowchart 700 for estimating the position 510 of a vehicle is shown. As an example, the vehicle may be a vehicle such as an aircraft 170 or an automobile.

At block 710, the control module 620, or more specifically, the processor 610 calculates a gravity vector 270 using a gravity spatial derivative 210 generated by the gravity gradiometer 110 and a plurality of body velocities generated by a body velocity source 120. The gravity gradiometer 110 and the body velocity source 120 are located in the vehicle. As previously mentioned, the processor 610 may apply a function 260 such as an integral over path function to the gravity spatial derivative 210 and the body velocity 220 to generate the gravity vector 270.

At block 720, the processor 610 calculates a gravity potential 430 based on the gravity vector 270. The processor 610 may apply the second function 420 such as an integral over path function to the gravity vector 270 to generate the gravity potential 430.

At block 730, the processor 610 estimates an inertial measurement unit (IMU)-based position 250 of the vehicle using the gravity vector 270, a body acceleration 230, and a body attitude 240. The IMU 130 is also located in the vehicle and generates the body acceleration 230 of the vehicle and the body attitude 240 of the vehicle. As an example, the processor 610 applies a filter 280 such as a Kalman filter to the gravity spatial derivative 210 and the body velocity 220, the gravity vector 270, the body acceleration 230, and the body attitude 240 to generate the IMU-based position 250 of the vehicle.

At block 740, the processor 610 estimates a gravity vector-based position 310 of the vehicle using the gravity vector 270. The processor 610 determines deviation of a vertical compensation 320 based on the gravity vector 270 and then estimates the gravity vector-based position 310 of the vehicle using the deviation of the vertical compensation 320.

At block 750, the processor 610 estimates a gravity map-based position 410 of the vehicle using the gravity potential 430 and one or more gravitational maps 440. As previously mentioned, the processor 610 receives the gravity spatial derivative 210 from the gravity gradiometer 110, receives the body velocity 220 from the body velocity source 120, and applies a function 260 to the gravity spatial derivative 210 and the body velocity 220 to generate the gravity vector 270. The processor 610 may apply a function 260 such as the integral over path function and/or an analytic modelling process on the gravity spatial derivative 210 to generate the gravity vector 270. The processor may apply a second function 420 such as a second integral over path function and/or a second analytic modelling process on the gravity vector 270 to generate the gravity potential 430.

The processor 610 may receive one or more gravitational maps 440 from the gravitational map source 140. The processor 610 may then apply a map matching algorithm 450 to the gravity potential 430 and the gravitational map(s) 440 to estimate a position in the gravitational map(s) 440 that has a gravity potential that matches the gravity potential 430. Upon identifying the position in the gravitational map 440 that matches the gravity potential 430, the processor 610 may assign the position to the gravity map-based position 410 of the vehicle. The gravity map-based position 410 of the vehicle may be in any suitable format such as geographical coordinates.

At block 760, the processor 610 estimates a position 510 of the vehicle based on the IMU-based position 250, the gravity vector-based position 310, and the gravity map-based position 410. The processor 610 may estimate the position 510 of the vehicle based on a function 550 of the IMU-based position 250, the gravity vector-based position 310, and the gravity map-based position 410. As an example, the function 550 may be an average of the IMU-based position 250, the gravity vector-based position 310, and the gravity map-based position 410. In such an example, the processor 610 utilizes the function 550 by determining an average of the geographical coordinates of the IMU-based position 250, the gravity vector-based position 310, and the gravity map-based position 410. The processor 610 may apply a function 550 that is a weighted average of the IMU-based position 250, the gravity vector-based position 310, and the gravity map-based position 410. In such an example, each of the IMU-based position 250, the gravity vector-based position 310, and the gravity map-based position 410 may be assigned a weighting factor 520, 530, 540. As an example and as previously described, the weighting factor 520, 530, 540 may be based on the accuracy of the IMU-based position 250, the gravity vector-based position 310, and the gravity map-based position. As an example, a first weighting factor 520 is assigned to the IMU-based position 250, a second weighting factor 530 is assigned to the gravity vector-based position 310, and a third weighting factor 540 is assigned to the gravity map-based position 410. The processor 610 may determine the estimated position 510 of the vehicle by averaging the geographical coordinates of the IMU-based position 250, the gravity vector-based position 310, and the gravity map-based position 410 in combination with the first, second, and third weighting factors 520, 530, 540, respectively.

At block 770, the processor 610 controls at least one of the vehicle and a second vehicle based on the estimated position 510 of the vehicle. As an example, the processor 610 may generate a route plan for the vehicle based on the estimated position 510 of the vehicle and a predetermined destination for the vehicle. As another example, the processor 610 may control or operate the vehicle from the estimated position 510 to the predetermined destination. In such an example, the processor 610 may activate a vehicle system such as an autonomous or semi-autonomous driving within the vehicle, to operate and drive the vehicle. The processor 610 may control the vehicle to travel along the route in the route plan. The processor 610 may control the vehicle and/or the second vehicle based on the estimated position 510 of the vehicle. As an example, the second vehicle may be proximate to the vehicle. The processor 610 may determine the position of the second vehicle based on the estimated position 510 of the vehicle and the distance between the vehicle and the second vehicle. The processor 610 may then control the second vehicle such as determining navigation and/or route planning of the second vehicle based on the positions of the vehicle and the second vehicle.

The flowchart 700 can end. Alternatively, the flowchart 700 can return to block 710 or some other block. The flowchart 700 can be repeated at any suitable point, such as at a suitable time or upon the occurrence of any suitable event or condition.

It will be appreciated that arrangements described herein can provide numerous benefits, including one or more of the benefits mentioned herein. For example, arrangements described herein allow for continuous and undisturbed vehicle position estimation. Arrangements described herein can be utilized with over-the-counter products, which provides an economic advantage. Arrangements described herein do not require measurements from external measuring sources such as satellites and/or ground stations.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (e.g., open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope.

Further aspects are provided by the subject matter of the following clauses.

A system for estimating a position of a vehicle. The vehicle includes a gradiometer. The system includes a processor and a memory. The memory storing machine-readable instructions that, when executed by the processor, cause the processor to calculate a gravity vector using a gravity spatial derivative generated by the gradiometer and a plurality of body velocities generated by a body velocity source; calculate a gravity potential based on the gravity vector; estimate an inertial measurement unit (IMU)-based position of the vehicle using the gravity vector, a body acceleration, and a body attitude, the body acceleration and the body attitude being of the vehicle and being generated by an IMU; estimate a gravity vector-based position of the vehicle using the gravity vector; estimate a gravity map-based position of the vehicle using the gravity potential and one or more gravitational maps; estimate the position of the vehicle based on the IMU-based position, the gravity vector-based position, and the gravity map-based position; and control at least one of the vehicle and a second vehicle based on the position of the vehicle.

The system according to any of the preceding clauses, wherein the machine-readable instructions further include machine-readable instructions that when executed by the processor cause the processor to output the position of the vehicle to an output system, and the output system is at least one of a speaker or a display screen.

The system according to any of the preceding clauses, wherein the machine-readable instructions further include machine-readable instructions that when executed by the processor cause the processor to calculate the gravity vector by applying an integral over path function to the gravity spatial derivative and the plurality of body velocities.

The system according to any of the preceding clauses, wherein the machine-readable instructions further include machine-readable instructions that when executed by the processor cause the processor to estimate the IMU-based position of the vehicle by applying a filter to the gravity vector, the body acceleration, and the body attitude.

The system according to any of the preceding clauses, wherein the machine-readable instructions further include machine-readable instructions that when executed by the processor cause the processor to determine deviation of a vertical compensation based on the gravity vector and estimate the gravity vector-based position of the vehicle using the deviation of the vertical compensation.

The system according to any of the preceding clauses, wherein the machine-readable instructions further include machine-readable instructions that when executed by the processor cause the processor to calculate the gravity potential by applying an integral over path function to the gravity vector.

The system according to any of the preceding clauses, wherein the machine-readable instructions further include machine-readable instructions that when executed by the processor cause the processor to estimate the gravity map-based position by applying a map matching algorithm to the gravity potential and the one or more gravitational maps.

A method for estimating a position of a vehicle. The vehicle includes a gradiometer. The method includes calculating, by a processor, a gravity vector using a gravity spatial derivative generated by the gradiometer and a plurality of body velocities generated by a body velocity source; calculating, by the processor, a gravity potential based on the gravity vector; estimating, by the processor, an inertial measurement unit (IMU)-based position of the vehicle using the gravity vector, a body acceleration, and a body attitude, the body acceleration and the body attitude being of the vehicle and being generated by an IMU; estimating, by the processor, a gravity vector-based position of the vehicle using the gravity vector; estimating, by the processor, a gravity map-based position of the vehicle using the gravity potential and one or more gravitational maps; estimating, by the processor, the position of the vehicle based on the IMU-based position, the gravity vector-based position, and the gravity map-based position; and controlling at least one of the vehicle and a second vehicle based on the position of the vehicle.

The method according to any preceding clauses, further comprising outputting the position of the vehicle to an output system, and the output system is at least one of a speaker or a display screen.

The method according to any preceding clauses, wherein calculating the gravity vector includes calculating the gravity vector by applying an integral over path function to the gravity spatial derivative and the plurality of body velocities.

The method according to any preceding clauses, wherein estimating the IMU-based position of the vehicle includes applying a filter to the gravity vector, the body acceleration, and the body attitude.

The method according to any preceding clauses, wherein estimating the gravity vector-based position of the vehicle includes determining a deviation of a vertical compensation based on the gravity vector and estimating the gravity vector-based position of the vehicle using the deviation of the vertical compensation.

The method according to any preceding clauses, wherein calculating the gravity potential further includes calculating the gravity potential by applying an integral over path function to the gravity vector.

The method according to any preceding clauses, wherein estimating the gravity map-based position of the vehicle includes estimating the gravity map-based position by applying a map matching algorithm to the gravity potential and the one or more gravitational maps.

A non-transitory computer-readable medium for estimating a position of a vehicle. The vehicle includes a gradiometer. The non-transitory computer-readable medium includes instructions that when executed by a processor cause the processor to: calculate a gravity vector using a gravity spatial derivative generated by the gradiometer and a plurality of body velocities generated by a body velocity source; calculate a gravity potential based on the gravity vector; estimate an inertial measurement unit (IMU)-based position of the vehicle using the gravity vector, a body acceleration, and a body attitude, the body acceleration and the body attitude being of the vehicle and being generated by an IMU; estimate a gravity vector-based position of the vehicle using the gravity vector; estimate a gravity map-based position of the vehicle using the gravity potential and one or more gravitational maps; estimate the position of the vehicle based on the IMU-based position, the gravity vector-based position, and the gravity map-based position; and control at least one of the vehicle and a second vehicle based on the position of the vehicle.

The non-transitory computer-readable medium according to any of the preceding clauses, wherein instructions further include instructions that when executed by the processor cause the processor to output the position of the vehicle to an output system, and the output system is at least one of a speaker or a display screen.

The non-transitory computer-readable medium according to any of the preceding clauses, wherein the instructions further include instructions that when executed by the processor cause the processor to calculate the gravity vector by applying an integral over path function to the gravity spatial derivative and the plurality of body velocities.

The non-transitory computer-readable medium according to any of the preceding clauses, wherein the instructions further include instructions that when executed by the processor cause the processor to estimate the IMU-based position of the vehicle by applying a filter to the gravity vector, the body acceleration, and the body attitude.

The non-transitory computer-readable medium according to any of the preceding clauses, wherein the instructions further include instructions that when executed by the processor cause the processor to determine deviation of a vertical compensation based on the gravity vector and estimate the gravity vector-based position of the vehicle using the deviation of the vertical compensation.

The non-transitory computer-readable medium according to any of the preceding clauses, wherein the instructions further include instructions that when executed by the processor cause the processor to calculate the gravity potential by applying an integral over path function to the gravity vector.

What is claimed is:

1. A system for estimating a position of a vehicle, the vehicle including a gradiometer, the system comprising:

a processor; and a memory storing machine-readable instructions that, when executed by the processor, cause the processor to:

calculate a gravity vector using a gravity spatial derivative generated by the gradiometer and a plurality of body velocities generated by a body velocity source;

calculate a gravity potential based on the gravity vector;

estimate an inertial measurement unit (IMU)-based position of the vehicle using the gravity vector, a body acceleration, and a body attitude, the body acceleration and the body attitude being of the vehicle and being generated by an IMU;

estimate a gravity vector-based position of the vehicle using the gravity vector;

estimate a gravity map-based position of the vehicle using the gravity potential and one or more gravitational maps;

estimate the position of the vehicle based on the IMU-based position, the gravity vector-based position, and the gravity map-based position; and control at least one of the vehicle and a second vehicle based on the position of the vehicle.

2. The system of claim 1, wherein the machine-readable instructions further include machine-readable instructions that when executed by the processor cause the processor to:

output the position of the vehicle to an output system, wherein the output system is at least one of a speaker or a display screen.

3. The system of claim 1, wherein the machine-readable instructions further include machine-readable instructions that when executed by the processor cause the processor to:

calculate the gravity vector by applying an integral over path function to the gravity spatial derivative and the plurality of body velocities.

4. The system of claim 1, wherein the machine-readable instructions further include machine-readable instructions that when executed by the processor cause the processor to:

estimate the IMU-based position of the vehicle by applying a filter to the gravity vector, the body acceleration, and the body attitude.

5. The system of claim 1, wherein the machine-readable instructions further include machine-readable instructions that when executed by the processor cause the processor to:

determine deviation of a vertical compensation based on the gravity vector; and estimate the gravity vector-based position of the vehicle using the deviation of the vertical compensation.

6. The system of claim 1, wherein the machine-readable instructions further include machine-readable instructions that when executed by the processor cause the processor to:

calculate the gravity potential by applying an integral over path function to the gravity vector.

7. The system of claim 1, wherein the machine-readable instructions further include machine-readable instructions that when executed by the processor cause the processor to:

estimate the gravity map-based position by applying a map matching algorithm to the gravity potential and the one or more gravitational maps.

8. A method for estimating a position of a vehicle, the vehicle including a gradiometer, the method comprising:

calculating, by a processor, a gravity vector using a gravity spatial derivative generated by the gradiometer and a plurality of body velocities generated by a body velocity source;

calculating, by the processor, a gravity potential based on the gravity vector;

estimating, by the processor, an inertial measurement unit (IMU)-based position of the vehicle using the gravity vector, a body acceleration, and a body attitude, the body acceleration and the body attitude being of the vehicle and being generated by an IMU;

estimating, by the processor, a gravity vector-based position of the vehicle using the gravity vector;

estimating, by the processor, a gravity map-based position of the vehicle using the gravity potential and one or more gravitational maps;

estimating, by the processor, the position of the vehicle based on the IMU-based position, the gravity vector-based position, and the gravity map-based position; and controlling at least one of the vehicle and a second vehicle based on the position of the vehicle.

9. The method of claim 8, further comprising outputting the position of the vehicle to an output system, wherein the output system is at least one of a speaker or a display screen.

10. The method of claim 8, wherein calculating the gravity vector includes calculating the gravity vector by applying an integral over path function to the gravity spatial derivative and the plurality of body velocities.

11. The method of claim 8, wherein estimating the IMU-based position of the vehicle includes applying a filter to the gravity vector, the body acceleration, and the body attitude.

12. The method of claim 8, wherein estimating the gravity vector-based position of the vehicle includes determining a deviation of a vertical compensation based on the gravity vector and estimating the gravity vector-based position of the vehicle using the deviation of the vertical compensation.

13. The method of claim 8, wherein calculating the gravity potential further includes calculating the gravity potential by applying an integral over path function to the gravity vector.

14. The method of claim 8, wherein estimating the gravity map-based position of the vehicle includes estimating the gravity map-based position by applying a map matching algorithm to the gravity potential and the one or more gravitational maps.

15. A non-transitory computer-readable medium for estimating a position of a vehicle, the vehicle including a gradiometer, the non-transitory computer-readable medium including instructions that when executed by a processor cause the processor to:

calculate a gravity vector using a gravity spatial derivative generated by the gradiometer and a plurality of body velocities generated by a body velocity source;

calculate a gravity potential based on the gravity vector;

estimate an inertial measurement unit (IMU)-based position of the vehicle using the gravity vector, a body acceleration, and a body attitude, the body acceleration and the body attitude being of the vehicle and being generated by an IMU;

estimate a gravity vector-based position of the vehicle using the gravity vector;

estimate a gravity map-based position of the vehicle using the gravity potential and one or more gravitational maps;

estimate the position of the vehicle based on the IMU-based position, the gravity vector-based position, and the gravity map-based position; and control at least one of the vehicle and a second vehicle based on the position of the vehicle.

16. The non-transitory computer-readable medium of claim 15, wherein the instructions further include instructions that when executed by the processor cause the processor to:

output the position of the vehicle to an output system, wherein the output system is at least one of a speaker or a display screen.

17. The non-transitory computer-readable medium of claim 15, wherein the instructions further include instructions that when executed by the processor cause the processor to:

calculate the gravity vector by applying an integral over path function to the gravity spatial derivative and the plurality of body velocities.

18. The non-transitory computer-readable medium of claim 15, wherein the instructions further include instructions that when executed by the processor cause the processor to:

estimate the IMU-based position of the vehicle by applying a filter to the gravity vector, the body acceleration, and the body attitude.

19. The non-transitory computer-readable medium of claim 15, wherein the instructions further include instructions that when executed by the processor cause the processor to:

determine deviation of a vertical compensation based on the gravity vector; and estimate the gravity vector-based position of the vehicle using the deviation of the vertical compensation.

20. The non-transitory computer-readable medium of claim 15, wherein the instructions further include instructions that when executed by the processor cause the processor to:

calculate the gravity potential by applying an integral over path function to the gravity vector.

* * * * *